(12) United States Patent
Wu et al.

(10) Patent No.: US 11,481,675 B2
(45) Date of Patent: Oct. 25, 2022

(54) IDENTITY RECOGNITION SYSTEM BASED ON COMPRESSED SIGNALS AND METHOD THEREOF

(71) Applicant: NATIONAL TAIWAN UNIVERSITY, Taipei (TW)

(72) Inventors: An-Yeu Wu, Taipei (TW); Ching-Yao Chou, Taipei (TW); Yo-Woei Pua, Taipei (TW); Win-Ken Beh, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 496 days.

(21) Appl. No.: 16/547,415

(22) Filed: Aug. 21, 2019

(65) Prior Publication Data
US 2021/0056460 A1   Feb. 25, 2021

(51) Int. Cl.
  *G06N 20/00*   (2019.01)
  *G06F 16/28*   (2019.01)

(52) U.S. Cl.
  CPC .......... *G06N 20/00* (2019.01); *G06F 16/285* (2019.01)

(58) Field of Classification Search
  CPC .............................. G06N 20/00; G06F 16/285
  See application file for complete search history.

(56) References Cited

U.S. PATENT DOCUMENTS

2016/0256063 A1*  9/2016  Friedman ............. A61B 5/6861
2018/0350468 A1* 12/2018  Friedman ........... A61B 5/14546

OTHER PUBLICATIONS

Amiruddin, 2015, IEEE, pp. 479-484.*
Ceylan, 2006, Elsevier, pp. 286-295.*
Dar, 2015, IEEE, pp. 479-484.*
Geum, ETRI, 2012, pp. 439-449.*
Li, 2016, p. pp. 1-16.*
Palaniappan, 2004, pp. 569-572.*
Thomas, 2014, Elsevier, pp. 715-721.*
You, 2018, Elsevier, pp. 42-53.*

* cited by examiner

*Primary Examiner* — Michael I Ezewoko
(74) *Attorney, Agent, or Firm* — Chih Feng Yeh; Huntington IP Consulting Co., Ltd.

(57) ABSTRACT

An identity recognition system based on compressed signals and a method thereof are provided. When a sensing end is in an identification mode, it continuously measures a physiological identification signal of a user having at least one first predetermined length of time, and performs a compression process on the physiological identification signal having at least one first predetermined length of time to generate a first compressed signal. An identification end receives the first compressed signal, obtains first identification information of the first compressed signal in a discrimination subspace according to a principal eigenvector, and recognizes the first identification signal according to a classification model from a learning end to determine that the user is one of multiple subjects. Therefore, the sensing end uses compressive technology to reduce the energy required to transmit signals, and the identification end recognizes identity without reconstructing the first compressed signal transmitted by the sensing end.

6 Claims, 5 Drawing Sheets

FIG. 1 continuously measuring a physiological identification signal of each subject having at least one second predetermined time when the sensing wearable device being in a learning mode, and performing the compression process on the physiological identification signal of each subject having at least one second predetermined time to generate a second compressed signal, and transmitting the second compressed signal corresponding to each subject ⸺ 210 the learning computer device receiving the second compressed signal corresponding to each subject, and obtaining second identification information of the second compressed signal in the discrimination subspace according to the principal eigenvector, and training a classification model according to the second identification information through a machine learning algorithm, and transmitting the classification model to the identification computer device ⸺ 220

FIG. 2A continuously measuring a physiological identification signal of a user having at least one first predetermined time when the sensing wearable device being in a identification mode, and performing the compression process on the physiological identification signal having the at least one first predetermined time to generate a first compressed signal, and transmitting the first compressed signal ⸺ 230 the identification computer device receiving the first compressed signal, and obtaining first identification information of the first compressed signal in the discrimination subspace according to the principal eigenvector, and receiving the first identification information, and recognizing the first identification information according to the classification model from the learning computer device, to determine that the user is one of multiple subjects ⸺ 240

IDENTITY RECOGNITION SYSTEM BASED ON COMPRESSED SIGNALS AND METHOD THEREOF

BACKGROUND

1. Technical Field

The present disclosure relates to an identity recognition system and a method thereof, and more particularly to an identity recognition system based on compressed signals and a method thereof

2. Description of Related Arts

In recent years, with the popularity and flourishing of compressive sensing, its application range has become more and more extensive, such as Internet backbone and biomedical signal monitoring system.

Generally speaking, the compressive sensing is to obtain a low-dimensional measurement value for a high-dimensional sparse signal by means of a sampling matrix. Therefore, the system only needs to use a low-dimensional signal as a transfer, and when necessary, reconstruct the low-dimensional sample into a high-dimensional signal by means of methods such as norm minimization. However, in addition to considering the sparse characteristics of the signal (the signal needs to be sparse enough to be recovered), it is also necessary to spend a lot of time and resources on the back end to reconstruct and restore the compressed signal before further use of the restored signal, which limits the convenience of its application.

In conclusion, as can be known, the prior art has the problem that the compressed signal needs to be reconstructed and restored for further use and application; therefore, it is necessary to propose an improved technical solution to resolve the problem.

SUMMARY

The present disclosure is to provide an identity recognition system based on

First, the present invention discloses an identity recognition system based on compressed signals, which includes a sensing wearable device and an identification computer device, wherein the sensing wearable device has an identification mode and a learning mode and includes a measurement module, a compression module and a first transmission module, and the identification computer device includes a first signal separation module and an identification module. When the sensing wearable device is in the identification mode, the measurement module is configured to continuously measure a physiological identification signal of a user having at least one first predetermined length of time, and the compression module is configured to perform a compression process on the physiological identification signal having at least one first predetermined length of time to generate a first compressed signal, and the first transmission module is configured to transmit the first compressed signal. The first signal separation module is configured to receive the first compressed signal, and obtain first identification information of the first compressed signal in a discrimination subspace according to a principal eigenvector, and the identification module is configured to receive the first identification information, and recognize the first identification information according to a classification model from a learning computer device, to determine that the user is one of multiple subjects.

In addition, the present invention discloses an identity recognition method based on compressed signals, includes the steps of: continuously measuring a physiological identification signal of a user having at least one first predetermined length of time when a sensing wearable device being in a identification mode, and performing a compression process on the physiological identification signal having at least one first predetermined length of time to generate a first compressed signal, and transmitting the first compressed signal; and an identification computer device receiving the first compressed signal, and obtaining first identification information of the first compressed signal in a discrimination subspace according to a principal eigenvector, and receiving the first identification information, and recognizing the first identification information according to a classification model from a learning end computer device, to determine that the user is one of multiple subjects.

According aforementioned content, the difference between the present disclosure and the conventional technology is that when in an identification mode, a sensing wearable device continuously measures a physiological identification signal of a user having at least one first predetermined time, and performs the compression process on the physiological identification signal having at least one first predetermined length of time to generate a first compressed signal, and transmits the first compressed signal; and an identification computer device receives the first compressed signal, and obtains first identification information of the first compressed signal in a discrimination subspace according to the principal eigenvector, and receives the first identification information, and recognizes the first identification information according to the classification model from the learning computer device, to determine that the user is one of multiple subjects.

By above technical means, the present invention can make the sensing wearable device use compressive technology to reduce the energy required to transmit signals and prolong the service life of the battery; the identification computer device performs identity identification on the first compressed signal according to the principal eigenvector and the dynamically adjusted classification model, without reconstruction of the first compressed signal transmitted by the sensing wearable device, thereby simplifying the calculation procedure and reducing the time required for identity recognition.

BRIEF DESCRIPTION OF THE DRAWINGS

The structure, operating principle and effects of the present disclosure will be described in detail by way of various embodiments which are illustrated in the accompanying drawings.

FIG. 2A is a flowchart of an embodiment of a learning stage of an identity recognition method based on compressed signals performed by the identity recognition system of FIG. 1.

FIG. 2B is a flowchart of an embodiment of an identification stage of the identity recognition method based on the compressed signals performed by the identity recognition system of FIG. 1.

DETAILED DESCRIPTION OF THE PREFERRED EMBODIMENTS

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included for the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

As used herein, the term "or" includes any and all combinations of one or more of the associated listed items. In addition, unless explicitly described to the contrary, the word "comprise" and variations such as "comprises" or "comprising", will be understood to imply the inclusion of stated elements but not the exclusion of any other elements.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present invention.

The nouns defined in the present invention are illustrated before description of an identity recognition system based on compressed signals and a method thereof. The sensing wearable device, the identification computer device, and the learning computer device included in the identity recognition system based on compressed signals can be implemented by various manners including software, hardware, firmware or any combination thereof. In some embodiments, the sensing wearable device can be implemented using software and/or hardware, and the scope of the invention is not limited in this respect. In an embodiment, the software or firmware used for implementation of the present invention can be stored in machine-readable storage medium such as ROM memory, RAM memory, magnetic disk storage medium, optical storage medium, flash memory device and so on, and can be performed by at least one general-purpose programmable microprocessor or dedicated programmable microprocessor. The sensing wearable device and the identification computer device of the present invention and the sensing wearable device and the learning computer device of the present invention can communicate with each other through the wireless transmission technology, wherein the wireless transmission technology can be, but not limited to, infrared transmission technology, Bluetooth, radio frequency identification technology, Wi-Fi or ZigBee. The learning computer device and the identification computer device of the present invention can use a copper transmission cable, optical fiber transmission, wireless transmission, an router, an firewall, an switch, an gateway computer and/or an edge server to transmit information and data to each other, so that the learning computer device and the identification computer device can communicate with each other for the transmission of information and data.

In addition, the present invention trains a classification model according to the identification information of a plurality of subjects through a machine learning algorithm to recognize the identification information of the user, and then determine that the user is one of the subjects. The classification model changes with the subjects, that is, it has the function of "self-correction update", and so the accuracy of identity recognition can be maintained.

In actual implementation, it can be divided into two stages. In the learning stage, the sensing wearable device is used to separately measure the physiological identification signal of each subject having a predetermined length of time, and compress the physiological identification signal by using a compression technique to generate a compressed signal, to reduce the transmitted semaphore, thereby reducing energy consumption. The learning computer device receives the compressed signal corresponding to each subject, and obtains the identification information of the compressed signal corresponding to each subject in a discrimination subspace according to a principal eigenvector, and then trains the classification model according to the identification information through a machine learning algorithm. Then, in the identification stage, the sensing wearable device uses the compression technology to compress the physiological identification signal of the user having another predetermined length of time to generate a compressed signal, and the identification computer device performs identity identification by using the principal eigenvector and the classification model based on the compressed signal corresponding to the user (i.e., the identification computer device determines that the user is one of the subjects in the learning stage).

The embodiments of the present invention will be described in detail below with reference to the drawings and embodiments, so that the application of the technical means to solve the technical problems and achieve the technical effects can be fully understood and implemented.

Figure 1:
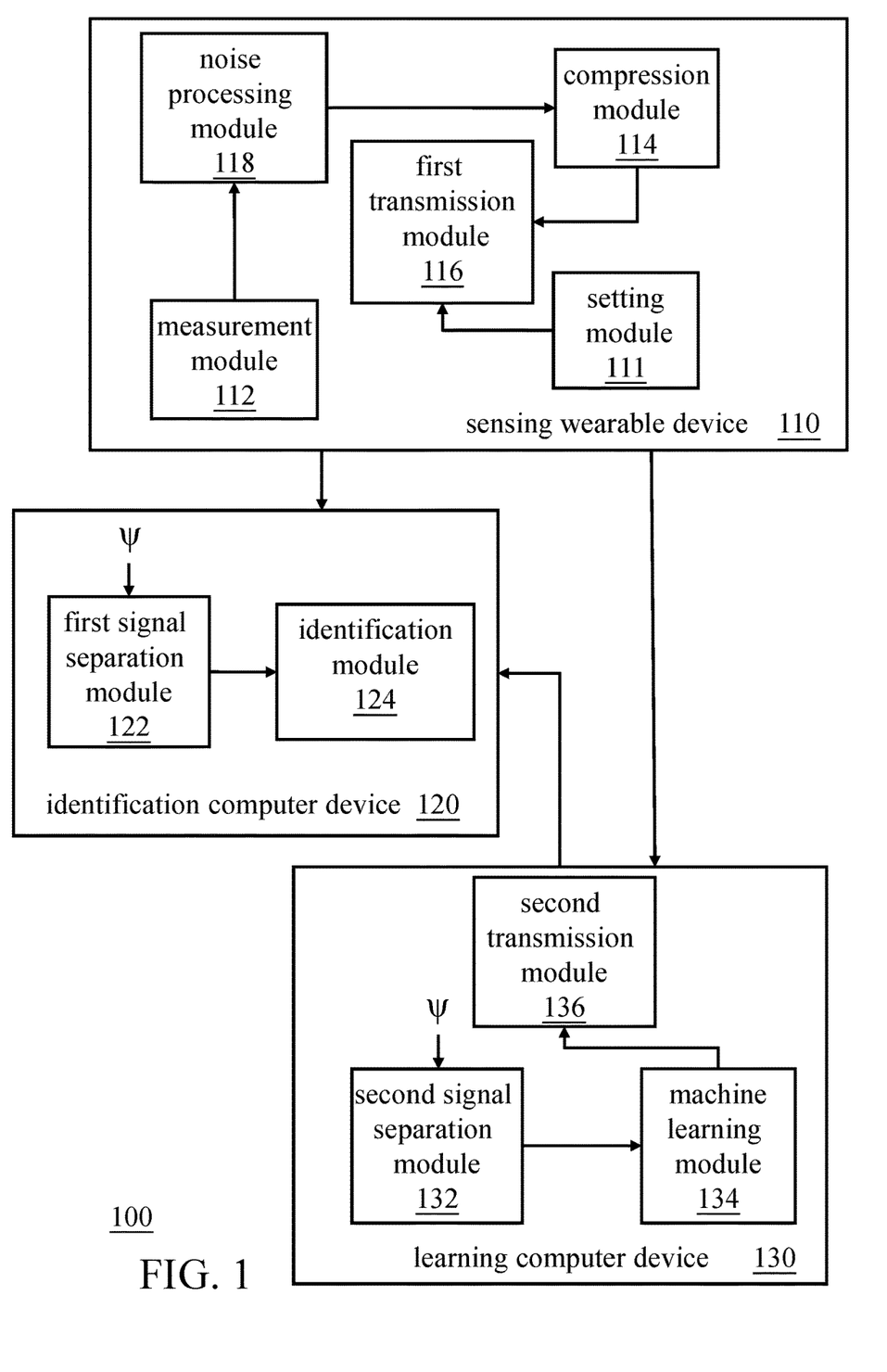
FIG. 1 is a system block diagram of an identity recognition system based on compressed signals of the present disclosure.

Please refer to FIG. 1, and FIG. 1 is a system block diagram of an identity recognition system based on compressed signals of the present disclosure. In the present embodiment, the identity recognition system 100 comprises a sensing wearable device 110 and an identification computer device 120. In practical implementation, the sensing wearable device 110 can be, but is not limited to, a wearable device, and the identification computer device 120 can be, but is not limited to, a computer.

The sensing wearable device 110 has an identification mode and a learning mode, and may comprise a measurement module 112, a compression module 114, and a first transmission module 116. When the sensing wearable device 110 is in the learning mode, the measurement module 112 can be used to continuously measure the physiological identification signal of each subject having at least one second predetermined length of time. The compression module 114 can be used to perform a compression process on the physiological identification signal for each subject having at least one second predetermined length of time to generate a second compressed signal corresponding to each subject. The first transmission module 116 is configured to transmit the second compressed signal corresponding to each subject. The physiological identification signal is a signal that can be used to recognize each person's identity, that is, the signal includes an identity characteristic that can identify each person. For example, the physiological identification signal can be, but not limited to, an electrocardiography (ECG) signal or a photoplethysmography (PPG) signal.

In more detail, in the present embodiment, the single sensing wearable device 110 is worn on a plurality of subjects for measurement separately, but the embodiment is not intended to limit the present invention. For example, each subject is equipped with a sensing wearable device 110 for physiological identification signal measurement.

The sensing wearable device 110 further comprises a setting module 111. When the sensing wearable device 110 is in the learning mode, before the measurement module 112 continuously measures the physiological identification signal of each subject having at least one second predetermined length of time, the setting module 111 receives the data based on each subject, which is input by the operator of the identity recognition system 100. Therefore, the setting information corresponding to each subject can be received. The setting information can include the number and the name of each subject, and the number can be presented in the form of a one-dimensional array, but the embodiment is not intended to limit the present invention. When the first transmission module 116 transmits the second compressed signal corresponding to each subject to the learning computer device 130, setting information corresponding to each subject may also be transmitted to the learning computer device 130.

When the sensing wearable device 110 is in the learning mode, the measurement module 112 can continuously measure the physiological identification signal of each subject having at least one second predetermined length of time through the sensor provided by the measurement module 112, and the measurement time can be limited to the second predetermined time, and the actual measurement time may be longer than or equal to the second predetermined time. In this embodiment, the second predetermined time may be, but not limited to, one hour, and the actual second predetermined time may be adjusted according to actual needs.

The compression module 114 can be configured to perform the compression process on the physiological identification signal of each subject having at least one second predetermined length of time to generate a second compressed signal corresponding to each subject, wherein the compressing process on the physiological identification signal having at least one second predetermined length of time is performed by using discrete cosine transform (DCT), discrete wavelet transformation (DWT), principal component analysis (PCA) or compressive sensing (CS) technology. It should be noted that, since the measurement module 112 continuously transmits the physiological identification signal of each subject to the compression module 114, the compression module 114 may first accumulate the physiological identification signal of each subject for at least one second predetermined length of time and then compress to generate the second compressed signal. In some embodiment, the compression module 114 can segmentally compress the physiological identification signal of each subject having at least one second predetermined length of time to generate the second compressed signal according to actual needs. In some embodiment, the physiological identification signal having at least one second predetermined length of time may be measured and compressed simultaneously by the compressive sensing technique. For example, when the length of the second predetermined time is one hour, the compression module 114 can accumulate one hour of physiological identification signal of each subject and perform one-time compression to generate the second compressed signal, or the compression module 114 can perform the compression process after accumulating one minute of the physiological identification signal of each subject, so that the second compressed signal corresponding to each subject is generated after performing the compression process 60 times.

In this embodiment, the sensing wearable device 110 further comprises a noise processing module 118 disposed between the compression module 114 and the measurement module 112. The noise processing module 118 can be used to remove noise from the physiological identification signal of each subject having at least one second predetermined length of time before the compression module 114 performs the compression process on the physiological identification signal of each subject having at least one second predetermined length of time. The noise processing module 118 comprises a high-pass filter, a low-pass filter, and a baseline removal unit.

The first transmission module 116 can be configured to transmit the second compressed signal corresponding to each subject. Since the compression module 114 can first accumulate the physiological identification signal of each subject for at least one second predetermined length of time and then compress to generate the second compressed signal, or the compression module 114 can segmentally compress the physiological identification signal of each subject having at least one second predetermined length of time to generate the second compressed signal, or the physiological identification signal for at least one second predetermined length of time may be measured and compressed simultaneously by the compressive sensing technique. The first transmission module 116 may transmit the second compressed signal corresponding to each subject at a time, or may segmentally transmit the second compressed signal corresponding to each subject.

The identity recognition system 100 may further comprise a learning computer device 130. The learning computer device 130 may comprise a second signal separation module 132, a machine learning module 134 and a second transmission module 136, wherein the second signal separation module 132 is configured to receive the second compressed signal corresponding to each subject, and obtain second identification information of the second compressed signal corresponding to each subject in the discrimination subspace according to the principal eigenvector $\psi$, the machine learning module 134 is configured to train the classification model according to the second identification information through a machine learning algorithm, and the second transmission module 136 is configured to transmit the classification model to the identification computer device 120. The principal eigenvector $\omega$ may be a preset vector set by the operator of the identity recognition system 100 according to his experience (the different kinds of physiological identification signal correspond to different preset vectors), or may be obtained by using the physiological recognition signals of multiple subjects through the PCA technology. The principal eigenvector$\psi$ does not change depending on the subjects.

In more detail, the second signal separation module 132 may divide the second compressed signal corresponding to each subject into the second identification information in the discrimination subspace and second complementary information in the complementary subspace according to the principal eigenvector$\psi$. Because the second complementary information belongs to the feature information commonly owned by each person, the second complementary information is not considered when performing identity identification. The machine learning module 134 can be configured to train the classification model according to the second identification information of each subject through a machine learning algorithm, wherein the machine learning algorithm can be, but not limited to, the support vector machine (SVM) algorithm or neural network (NN) algorithm. It should be noted that the classification model can change depending on the subjects. Therefore, when a new subject is added, the classification model can change, and the second transmission module 136 can transmit the latest classification model to the identification computer device 120 for subsequent identification use. In addition, when the second transmission module 136 transmits the classification model to the identification computer device 120, the setting information corresponding to each subject may also be transmitted to the identification computer device 120 for subsequent identification use.

In addition, it should be noted that the physiological identification signal of the subject may change when the subject is in the different emotions or exercises. In order to improve the accuracy of identity recognition, the physiological identification signal of the subject in various states, such as in the different emotions or exercising, may be measured. Then, the learning terminal 130 is provided to execute the above steps (the measurement is performed when the subject is in each state is the concept of adding a new subject, but the setting information received by the sensing wearable device 110 is the setting information corresponding to the subject) to adjust the classification model.

When the sensing wearable device 110 is in the identification mode, the measurement module 112 can be used to continuously measure the physiological identification signal of the user having at least one first predetermined length of time, and the compression module 114 can be used to perform the compression process on the physiological identification signal of the user having at least one first predetermined length of time to generate the first compressed signal, and the first transmission module 116 can be used to transmit the first compressed signal.

In more detail, the sensing wearable device 110 is worn on the user. When the sensing wearable device 110 is in the identification mode, the measurement module 112 can continuously measure the physiological identification signal of the user through the sensor provided by the measurement module 112, and the measurement time can be limited to the first predetermined time, and the actual measurement time may be greater than or equal to the first predetermined time. When the measurement time is greater than the first predetermined time, it represents the sustainable use of the present invention for identity recognition. The semaphore required to perform identity identification is the physiological identification signal having the first predetermined length of time. If the measurement time is greater than the first predetermined time, the measured physiological identification signal can be cut into N physiological identification signals having the first predetermined length of time; that is, the identity identification can be performed N times continuously, wherein N is a positive integer. It is suitable for plants or offices that require long-term monitoring of personnel to maintain information security. In this embodiment, the first predetermined time may be, but not limited to, 1 minute, and the actual first predetermined time may be adjusted according to actual needs.

The compression module 114 is connected to the measurement module 112, and can be used to perform the compression process on the physiological identification signal having at least one first predetermined length of time to generate the first compressed signal. It should be noted that, since the measurement module 112 continuously transmits the physiological identification signal to the compression module 114, the compression module 114 may first accumulate the physiological identification signal for the first predetermined length of time and then compress to generate the first compressed signal. In some embodiment, the compression module 114 can segmentally compress the physiological identification signal having the first predetermined length of time to generate the first compressed signal according to actual needs. In some embodiment, the physiological identification signal for the first predetermined length of time may be measured and compressed simultaneously through the compressive sensing technique. For example, when the first predetermined time is one minute, the compression module 114 can accumulate one minute of physiological identification signal and perform one-time compression to generate the first compressed signal, or the compression module 114 can perform the compression process after accumulating one second of the physiological identification signal, so that the first compressed signal is generated after performing the compression process 60 times. In this embodiment, the compressing process on the physiological identification signal having at least one first predetermined length of time is performed by using DCT, DWT, PCA or CS technique.

In this embodiment, the noise processing module 118 can be used to remove noise from the physiological identification signal having at least one first predetermined length of time before the compression module 114 performs the compression process on the physiological identification signal having at least one first predetermined length of time.

The first transmission module 116 is connected to the compression module 114 and can be used to transmit the first compressed signal. The compression module 114 may first accumulate the physiological identification signal for the first predetermined length of time and then compress to generate the first compressed signal, or may compress the received physiological identification signal every second and generate the first compressed signal after compressing the physiological identification signal of the first predetermined length of time, so the first transmission module 116 can transmit the first compressed signal at a time or can segmentally transmit the first compressed signal.

In the embodiment, the identification computer device 120 may comprise a first signal separation module 122 and an identification module 124. The first signal separation module 122 may be configured to receive the first compressed signal and obtain the first identification information of the first compressed signal in the discrimination subspace according to the principal eigenvector$\psi$. In an actual implementation, the first signal separation module 122 may divide the first compressed signal into the first identification information in the discrimination subspace and the first complementary information in the complementary subspace according to the principal eigenvector$\psi$. Because the first complementary information belongs to the feature information commonly owned by each person, the first complementary information is not considered when performing identity identification.

The identification module 124 is configured to receive the first identification information, and recognize the first identification information according to the classification model from the learning computer device 130, to determine that the user is one of the subjects that measure the physiological identification signal when the sensing wearable device 110 is in the learning mode. The classification model may be a model trained using the physiological identification signal of a plurality of subjects through the machine learning algorithm by the learning computer device 130, and the classification model may be changed depending on the subjects.

In more detail, the identification module 124 performs the identification calculation on the first identification information according to the classification model from the learning computer device 130 to generate a one-dimensional array corresponding thereto, and searches for the number in the setting information corresponding to each subject from the learning computer device 130 according to the one-dimensional array (the number is presented in a one-dimensional array manner). When the corresponding number is found, the name (i.e., the name of the subject) corresponding to the number is output. In other words, it is determined that the user is one of the subjects that measure the physiological identification signal when the sensing wearable device 110 is in the learning mode.

It should be noted that the sensing wearable device 110, the identification computer device 120 and the learning computer device 130 may respectively comprise a storage module (not drawn) for storing the physiological identification signal, the first compressed signal, the second compressed signal, the first identification information, the second identification information, the principal eigenvector$\psi$ or/and the setting information corresponding to each subject.

In addition, in the embodiment, the identification computer device 120 and the learning computer device 130 are two different devices. In actual implementation, the identification computer device 120 and the learning computer device 130 can be one device, and the first signal separation module 122 and the second signal separation module 132 can be one module, and there are different names and symbols only for distinguishing the role played in the learning stage (learning mode) or the identification stage (identification mode), and at this time, the second transmission module 136 can be omitted.

Furthermore, the identity recognition system 100 based on the compressed signal can also be applied to assist in determining whether the user has a particular disease. For example, when the sensing wearable device 110 is in the learning mode, the setting module 111 receives the data for each subject, who is in the healthy state, input by the operator of the identity recognition system 100, before the measurement module 112 continuously measures the ECG signal of each subject having at least one second predetermined length of time; that is, setting information corresponding to each subject can be received, wherein the setting information may comprises the information about whether the subject has atrial fibrillation (Af) or not, wherein the one-dimensional array can be used to indicate whether the subject has Af. It should be noted that some subjects need to have Af, and some subjects do not have Af. The measurement module 112 continuously measures the ECG signal of each subject having at least one second predetermined length of time, and the compression module 114 performs the compress process on the ECG signal of each subject having at least one second predetermined length of time to generate the second compressed signal, and the first transmission module 116 transmits the second compressed signal corresponding to each subject. The learning computer device 130 receives the second compressed signal corresponding to each subject, and obtains second identification information of the second compressed signal corresponding to each subject in the discrimination subspace according to the principal eigenvector$\psi$, and trains the classification model according to the second identification information through a machine learning algorithm, and transmits the classification model and the setting information to the identification computer device 120. The principal eigenvector$\psi$ may be a preset vector set by the operator of the identity recognition system 100 according to his experience, or may be obtained by using the ECG signal of multiple subjects through the PCA technology (some subjects have Af and some subjects have no Af). The principal eigenvector$\psi$ does not change depending on the subject.

When the sensing wearable device 110 is in the identification mode, it continuously measures the ECG signal of the user having at least one first predetermined length of time, and compresses the ECG signal having at least one first predetermined length of time to generate the first compressed signal, and transmits the first compressed signal. The identification computer device 120 receives the first compressed signal, and obtains the first identification information of the first compressed signal in the discrimination subspace according to the principal eigenvector$\psi$, and performs identity identification on the first identification information according to the classification model from the learning computer device 130 to determine whether the user has Af. In more detail, the identification module 124 performs the identification calculation on the first identification information according to the classification model from the learning computer device 130 to generate the one-dimensional array corresponding thereto. The identification module 124 determines that the one-dimensional array corresponding thereto matches the one-dimensional array that indicates the subject has Af or the one-dimensional array that indicates the subject has no Af from the learning computer device 130. According to the matching result, the corresponding result is output. In other words, the user is determined whether he has Af or not.

Next, please refer to FIG. 2A, and FIG. 2A is a flowchart of an embodiment of a learning stage of an identity recognition method based on compressed signals performed by the identity recognition system of FIG. 1. The method for recognizing the identification based on the compressed signals may comprise the steps of: continuously measuring a physiological identification signal of each subject having at least one second predetermined time when the sensing wearable device being in a learning mode, and performing the compression process on the physiological identification signal of each subject having at least one second predetermined time to generate a second compressed signal, and transmitting the second compressed signal corresponding to each subject (step 210); and the learning computer device receiving the second compressed signal corresponding to each subject, and obtaining second identification information of the second compressed signal in the discrimination subspace according to the principal eigenvector, and training a classification model according to the second identification information through a machine learning algorithm, and transmitting the classification model to the identification computer device (step 220). The detailed description has been described above and does not be described here.

Through the above steps, the learning computer device 120 can obtain the second identification information corresponding to each subject according to the principal eigenvector$\psi$, and then trains the classification model according to the second identification information through the machine learning algorithm, and the classification model is adjusted depending on the subjects, so that the identification computer device 120 can perform identity identification according to the adjusted classification model to maintain the accuracy of identity recognition.

Please refer to FIG. 2B, and FIG. 2B is a flowchart of an embodiment of an identification stage of the identity recognition method based on the compressed signals performed by the identity recognition system of FIG. 1. The method for recognizing the identification based on the compressed signals may further comprise the steps of: continuously measuring a physiological identification signal of a user having at least one first predetermined time when the sensing wearable device being in a identification mode, and performing the compression process on the physiological identification signal having the at least one first predetermined time to generate a first compressed signal, and transmitting the first compressed signal (step 230); and the identification computer device receiving the first compressed signal, and obtaining first identification information of the first compressed signal in the discrimination subspace according to the principal eigenvector, and receiving the first identification information, and recognizing the first identification information according to the classification model from the learning computer device, to determine that the user is one of multiple subjects (step 240). The compressing process on the physiological identification signal having at least the first predetermined length of time is performed by using DCT, DWT, PCA or CS technology. Moreover, the sensing wearable device removes noise from the physiological identification signal having at least one first predetermined length of time before the compression module 114 performs the compression process on the physiological identification signal having at least one first predetermined length of time. The detailed description has been described above and does not be described here.

Through the above steps, when the sensing wearable device 110 is in the identification mode, it continuously measures the physiological identification signal of the user having at least one first predetermined length of time and performs the compress process on the physiological identification signal of the user having at least one first predetermined length of time to generate the first compressed signal, and transmits the first compressed signal. The identification computer device 120 receives the first compressed signal, and obtains the first identification information of the first compressed signal in the discrimination subspace according to the principal eigenvector$\psi$, and performs identity identification on the first identification information according to the classification model from the learning mode 130 to determine that the user is one of the plurality of subjects. Therefore, the sensing wearable device 110 uses the compressive technology to reduce the energy required to transmit signals and prolong the service life of the battery; the identification computer device 120 performs identity identification on the first compressed signal according to the principal eigenvector$\psi$ and the dynamically adjusted classification model, without reconstruction of the first compressed signal transmitted by the sensing wearable device 110, thereby simplifying the calculation procedure and reducing the time required for identity recognition.

The method for recognizing the identification based on the compressed signals further comprises the following step of: the sensing wearable device receiving setting information corresponding to each subject when the sensing wearable device is in the learning mode, to transmit the second compressed signal and the setting information corresponding to each subject to the learning computer device (not drawn). The detailed description has been described above and does not be described here.

It should be noted that, if there is no causal relationship in the above steps, the present invention does not limit the order of execution thereof.

Figure 3A:
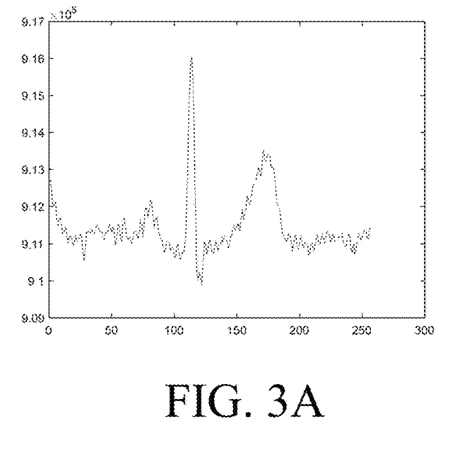
FIG. 3A to FIG. 3C are schematic diagrams of the ECG signals of three different subjects measured by a wearable device sensing of the present invention.
Figure 3B:
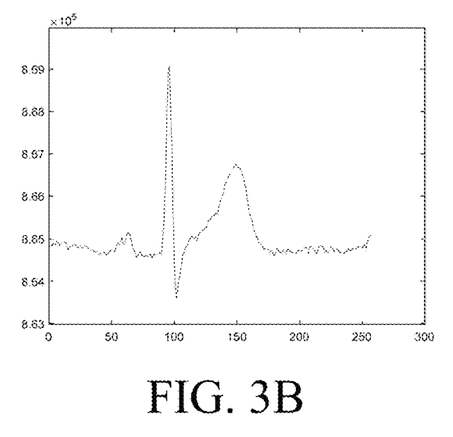
Figure 3C:
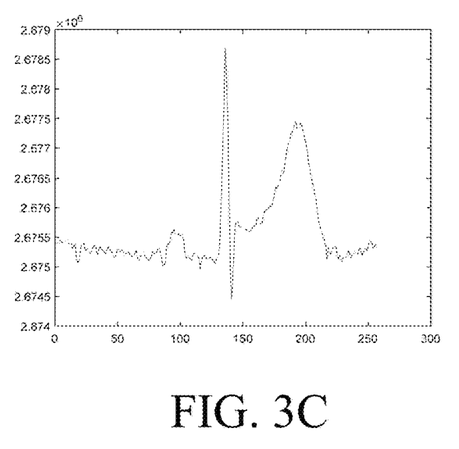

Hereinafter, the description of the learning stage can be made by way of an embodiment with reference to FIG. 1, and FIG. 3A to FIG. 7. Please refer to FIG. 1 and FIG. 3A to FIG. 3C, wherein FIG. 3A to FIG. 3C are schematic diagrams of the ECG signals of three different subjects measured by a sensing wearable device of the present invention. In this embodiment, the single sensing wearable device 110 is worn on three subjects (subject A, subject B and subject C) separately for measuring the ECG signal thereof. When the sensing wearable device 110 is in the learning mode, the measurement module 112 can measure the ECG signal of each subject through the sensors it has. FIG. 3A is a schematic diagram of the ECG signal of the subject A, FIG. 3B is a schematic diagram of the ECG signal of the subject B, and FIG. 3C is a schematic diagram of the ECG signal of the subject C. The measurement time can be limited to one hour. However, in order to avoid drawings of FIG. 3A to FIG. 3C being too large and complicated, only the ECG signals measured for one minute are represented. In this embodiment, the measurement module 112 can measure a 256-dimensional ECG signal over one minute.

Next, please refer to FIG. 1 and FIG. 4A to FIG. 4C, and FIG. 4A to FIG. 4C are schematic diagrams of the ECG signals of FIG. 3A to FIG. 3C after removing noise. In this embodiment, the noise processing module 118 may first remove the noise from the ECG signals of FIG. 3A to FIG. 3C, and then provide the compression module 114 for compression.

Figure 4A:
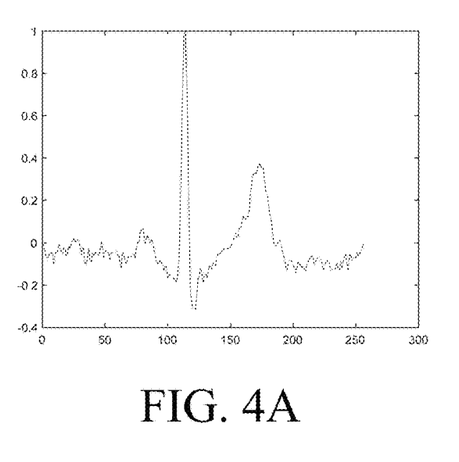
FIG. 4A to FIG. 4C are schematic diagrams of the ECG signals of FIG. 3A to FIG. 3C after removing noise.
Figure 4B:
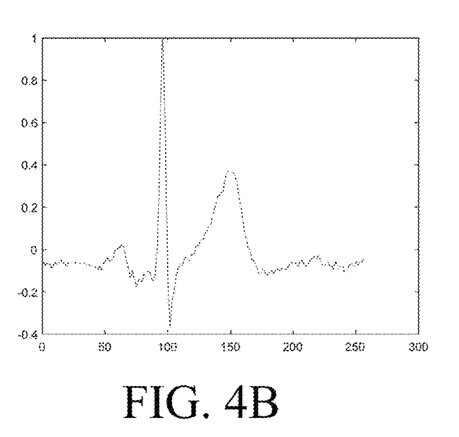
Figure 4C:
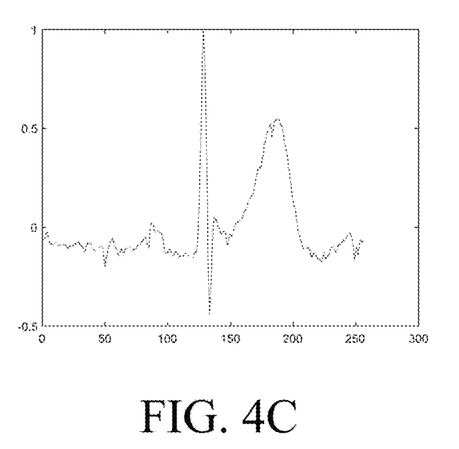
Figure 5A:
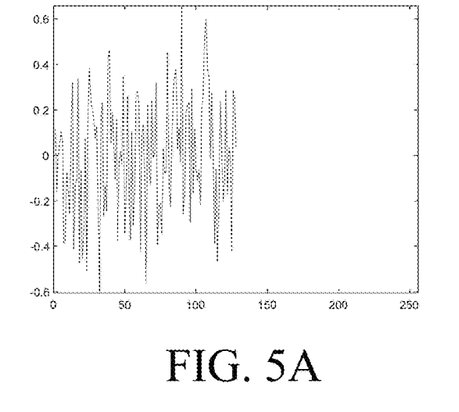
FIG. 5A to FIG. 5C are schematic diagrams of the second compressed signal generated after compressing the noise-removing ECG signals of FIG. 4A to FIG. 4C.
Figure 5B:
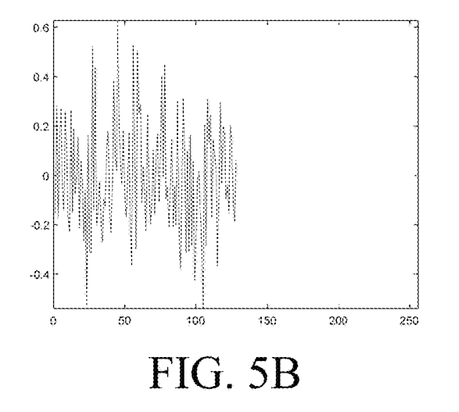
Figure 5C:
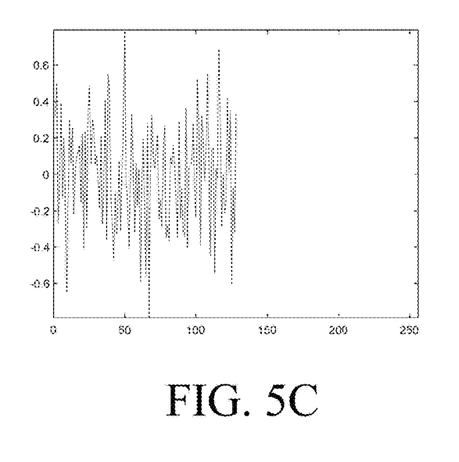

Please refer to FIG. 1 and FIG. 5A to FIG. 5C. FIG. 5A to FIG. 5C are schematic diagrams of the second compressed signal generated after compressing the noise-removing ECG signals of FIG. 4A to FIG. 4C are compressed. In this embodiment, the compression module 114 can perform the compression process on the ECG signal of each subject having one hour to generate the second compressed signal corresponding thereto. FIG. 5A is a schematic diagram of the second compressed signal of the subject A, FIG. 5B is a schematic diagram of the second compressed signal of the subject B, and FIG. 5C is a schematic diagram of the second compressed signal of the subject C. In this embodiment, the compression module 114 can compress the 256-dimensional ECG signal into a 128-dimensional second compressed signal through the CS technology.

Figure 6A:
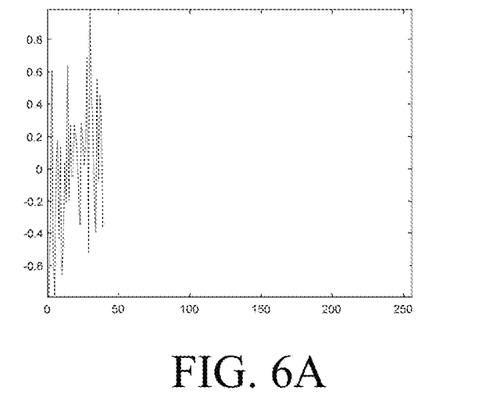
FIG. 6A to FIG. 6C are schematic diagrams of second identification information corresponding to three different subjects obtained by a learning computer device of the present invention.
Figure 6B:
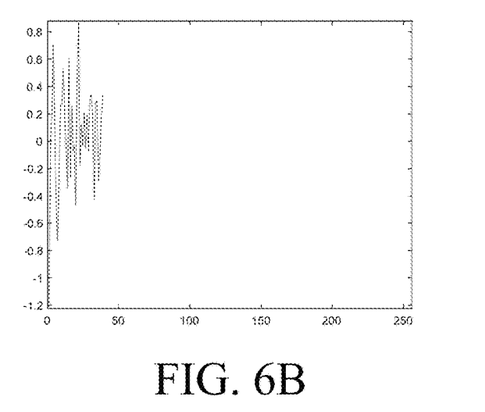
Figure 6C:
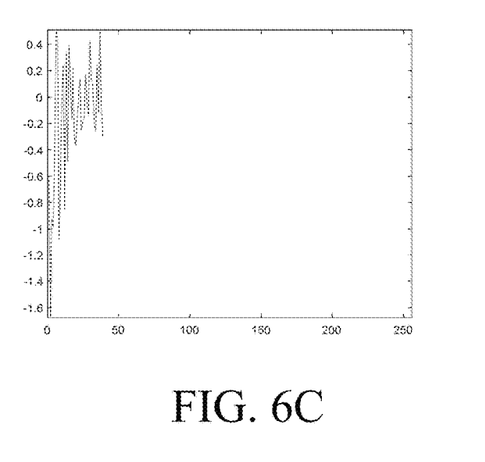

Please refer to FIG. 1 and FIG. 6A to FIG. 6C, wherein FIG. 6A to FIG. 6C are schematic diagrams of second identification information corresponding to three different subjects obtained by a learning computer device of the present invention. In this embodiment, the second signal separation module 132 can obtain the second identification information of the second compressed signal corresponding to each subject in the discrimination subspace according to the principal eigenvector$\psi$. FIG. 6A is a schematic diagram of the second identification information corresponding to subject A, FIG. 6B is a schematic diagram of the second identification information corresponding to subject B, and FIG. 6C is a schematic diagram of the second identification information corresponding to subject C. In order to avoid drawings of FIG. 6A to FIG. 6C being too large and complicated, and only the second identification information of the second compressed signals of FIG. 5A to FIG. 5C in the discrimination subspace obtained by the second signal separation module is used as representatives. In this embodiment, the principal eigenvector$\psi$ is an eigenvector of 256× 39 dimensions, so that the second identification information of FIG. 6A to FIG. 6C is the second identification information of 39 dimensions.

Figure 7:
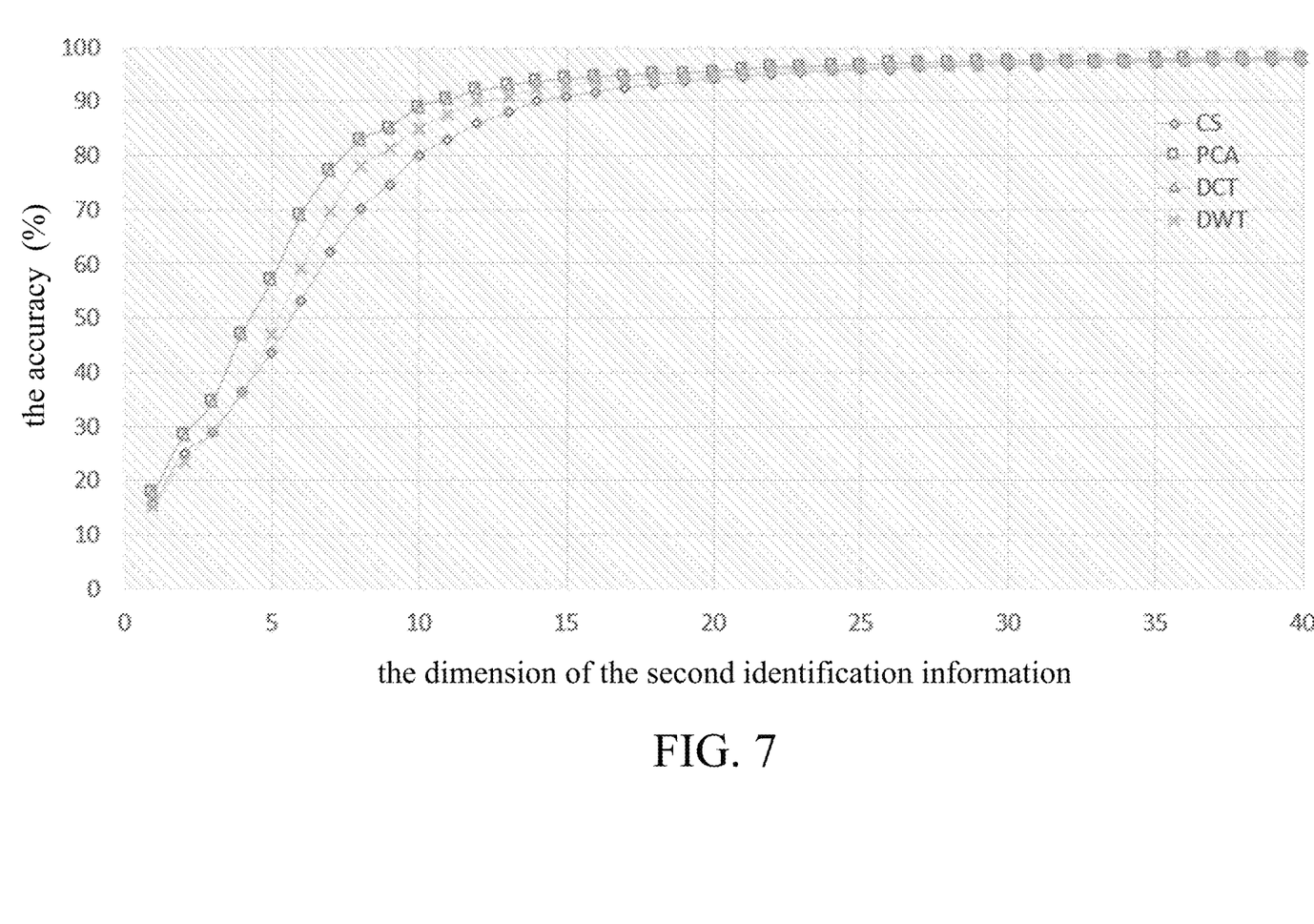
FIG. 7 is a schematic diagram showing the relationship between the accuracy of the different compression techniques and the dimension of the second identification information.

The principal eigenvector$\psi$ may be a preset vector set by the operator of the identity recognition system 100 according to his experience, or may be obtained by using physiological identification signals of multiple subjects through the PCA technology. The dimension of principal eigenvector$\psi$ can be adjusted according to actual needs. It should be noted that the compression technique used by the compression module 114 and the dimension of the second identification information may affect the accuracy of the subsequent identity recognition, as shown in FIG. 7. FIG. 7 is a schematic diagram showing the relationship between the accuracy of the different compression techniques and the dimension of the second identification information, wherein the vertical axis represents the accuracy of identity recognition, and the larger the value, the better; the horizontal axis represents the dimension of the second identification information; each series can represent the compression technique used by the compression module 114, which can be DCT technology (series labeled with triangulars), DWT technology (series labeled with crosses), PCA technology (series labeled with squares) and CS technology (series labeled with circles). In the FIG. 7, it can be seen that the relationship between the dimension of the second identification information and the accuracy of identity recognition is almost the same when DCT technology and PCA technology are used by the compression module 114. The higher the dimension of the second identification information, the higher the accuracy of identity recognition when DCT technology, DWT technology, PCA technology or CS technology are used by the compression module 114.

In this embodiment, the machine learning module 134 can train the classification model according to the second identification information through the machine learning algorithm. The second transmission module 136 can transmit the classification model to the identification computer device 120. Whenever a new subject is added, the classification model generated by the machine learning module 134 is changed, and the second transmission module 136 can transmit the latest classification model to the identification computer device 120, so that the identification computer device 120 maintains the accuracy of identity recognition.

In summary, it can be seen that the difference between the present invention and the prior art is that when in an identification mode, a sensing wearable device continuously measures a physiological identification signal of a user having at least one first predetermined time, and performs a compression process on the physiological identification signal having at least one first predetermined time to generate a first compressed signal, and transmits the first compressed signal; and an identification computer device receives the first compressed signal, and obtains first identification information of the first compressed signal in a discrimination subspace according to a principal eigenvector, and receives the first identification information, and recognizes the first identification information according to a classification model from a learning computer device, to determine that the user is one of multiple subjects. By using a technical means, the problem of the prior art can be solved. The sensing wearable device can use compressive technology to reduce the energy required to transmit signals and prolong the service life of the battery; and the identification computer device performs identity identification on the first compressed signal according to the principal eigenvector and the dynamically adjusted classification model, without reconstruction of the first compressed signal transmitted by the sensing wearable device, thereby simplifying the calculation procedure and reducing the time required for identity recognition.

In addition, the learning computer device may obtain the second identification information corresponding to each subject according to the principal eigenvector, and then trains the classification model according to the second identification information corresponding to each subject through the machine learning algorithm, and adjusts the classification model depending on the subjects. The identification computer device can perform identity identification according to the adjusted classification model to maintain the accuracy of identity recognition.

The present disclosure disclosed herein has been described by means of specific embodiments. However, numerous modifications, variations and enhancements can be made thereto by those skilled in the art without departing from the spirit and scope of the invention set forth in the claims.

What is claimed is:

1. An identity recognition system based on compressed signals, comprising:
 a sensing wearable device, having an identification mode and a learning mode and including a measurement module, a compression module and a first transmission module, wherein when the sensing wearable device is in the identification mode, the measurement module is configured to continuously measure a physiological identification signal of a user having at least one first predetermined length of time, and the compression module is configured to perform a compression process on the physiological identification signal having at least one first predetermined length of time to generate a first compressed signal, and the first transmission module is configured to transmit the first compressed signal; and
 an identification computer device, including a first signal separation module and an identification module, wherein the first signal separation module is configured to receive the first compressed signal, and obtain first identification information of the first compressed signal in a discrimination subspace according to a principal eigenvector, and the identification module is configured to receive the first identification information, and recognize the first identification information according to a classification model from a learning computer device, to determine that the user is one of multiple subjects without reconstruction of the first compressed signal transmitted by the measurement module, when the sensing wearable device is in the learning mode, the measurement module is configured to continuously measure a physiological identification signal of each subject having at least one second predetermined length of time, and the compression module is configured to perform the compression process on the physiological identification signal of each subject having at least one second predetermined length of time to generate a second compressed signal, and the first transmission module is configured to transmit the second compressed signal corresponding to each subject, and the learning computer device comprises a second signal separation module, a machine learning module and a second transmission module, wherein the second signal separation module is configured to receive the second compressed signal corresponding to each subject, and obtain second identification information of the second compressed signal in the discrimination subspace according to the principal eigenvector, and the machine learning module is configured to train the classification module according to the second identification information through a machine learning algorithm, and the second transmission module is configured to transmit the classification model to the identification computer device, wherein the compression process on the physiological identification signal having at least one first predetermined length of time is performed by using discrete cosine transform (DCT), discrete wavelet transformation (DWT), principal component analysis (PCA) or compressive sensing (CS) technology.

2. The identity recognition system according to claim 1, wherein the sensing wearable device further includes a setting module for receiving setting information corresponding to each subject when the sensing wearable device is in the learning mode, to make the first transmission module transmit the second compressed signal and the setting information corresponding to each subject to the learning computer device.

3. The identity recognition system according to claim 1, wherein the sensing wearable device further includes a noise processing module for removing noise from the physiological identification signal having at least one first predetermined length of time before the compression module performs the compression process on the physiological identification signal having at least one first predetermined length of time.

4. An identity recognition method based on compressed signals, comprising:
 when being in a identification mode, a sensing wearable device continuously measuring a physiological identification signal of a user having at least one first predetermined length of time, and performing a compression process on the physiological identification signal of the user having at least one first predetermined length of time to generate a first compressed signal, and transmitting the first compressed signal; and an identification computer device receiving the first compressed signal, and obtaining first identification information of the first compressed signal in a discrimination subspace according to a principal eigenvector, and receiving the first identification information, and recognizing the first identification information according to a classification model from a learning computer device, to determine that the user is one of multiple subjects without reconstruction of the first compressed signal transmitted by he measurement module, the sensing wearable device, when being in a learning mode, continuously measuring a physiological identification signal of each subject having at least one second predetermined length of time, and performing the compression process on the physiological identification signal of each subject having at least one second predetermined length of time to generate a second compressed signal, and transmitting the second compressed signal corresponding to each subject, and
 the learning computer device receiving the second compressed signal corresponding to each subject, and obtaining second identification information of the second compressed signal in the discrimination subspace according to the principal eigenvector, and train the classification model according to the second identification information through a machine learning algorithm, and transmitting the classification model to the identification computer device, wherein the compression process on the physiological identification signal having at least one first predetermined length of time is performed by using DCT, DWT, PCA or CS technology.

5. The identity recognition method according to claim 4, wherein further comprising:
 the sensing wearable device receiving setting information corresponding to each subject when the sensing wearable device is in the learning mode, to transmit the second compressed signal and the setting information corresponding to each subject to the learning computer device.

6. The identity recognition method according to claim 4, wherein before the step of performing the compression process on the physiological identification signal having at least one first predetermined length of time, further comprising: removing noise from the physiological identification signal having at least one first predetermined length of time.

* * * * *